Oct. 4, 1955                F. G. PRESNELL                 2,719,511
REACTION LIMITED POWER BOOSTER AUTOMOTIVE STEERING SYSTEMS
Filed July 2, 1954                                    2 Sheets-Sheet 1

INVENTOR.
FRANK G. PRESNELL
BY
*Forrest J. Lilly*
ATTORNEY

Oct. 4, 1955        F. G. PRESNELL        2,719,511

REACTION LIMITED POWER BOOSTER AUTOMOTIVE STEERING SYSTEMS

Filed July 2, 1954        2 Sheets-Sheet 2

INVENTOR.
FRANK G. PRESNELL
BY
ATTORNEY

United States Patent Office 2,719,511
Patented Oct. 4, 1955

2,719,511

REACTION LIMITED POWER BOOSTED AUTOMOTIVE STEERING SYSTEMS

Frank G. Presnell, Chillicothe, Ohio

Application July 2, 1954, Serial No. 440,891

8 Claims. (Cl. 121—41)

This invention relates generally to automotive steering systems and particularly to hydraulic power boosters for such steering systems.

It is unnecessary at this time to discuss the features and advantages of power assisted steering, as these are well undertood in the art. Suffice it to say that it is recognized universally that the driver should retain some "feel" of the turning force to afford him a means of sensing lateral steering force. It is particularly desirable that the driver be afforded adequate feel in high speed driving, and it is also particularly desirable that driver effort be held low under conditions of high road wheel steering force, as in parking or traversing soft or rutted roads. Heretofore systems giving adequate steering load feel in normal smooth road driving have required objectionably high driver effort under conditions of high road wheel steering force, while systems giving lower driver effort under conditions of high road wheel steering force have had what many considered inadequate "feel" in normal smooth road driving.

The general object of the present invention, accordingly, is to provide a reaction limited power booster which transmits an adequate load feel to the driver under conditions of smooth road driving, but in which the load feel reaction is limited upon attaining some adequate predetermined maximum value corresponding to a selected road wheel steering force, and is held at such maximum for all greater values of road wheel steering force.

The present invention contemplates broadly a hydraulic booster system comprising a combination of hydraulic reaction and spring device for exerting a steering load feel force which is transmitted to the steering wheel, for causing this force to increase as a function of road wheel steering force to some predetermined limiting value, and for then holding the load feel force at such value for further increasing values of road wheel steering force.

The broad invention may be carried into practice in a number of ways, and several of these will be indicated. For this purpose, reference is had to the accompanying drawings, in which.

Figure 1:
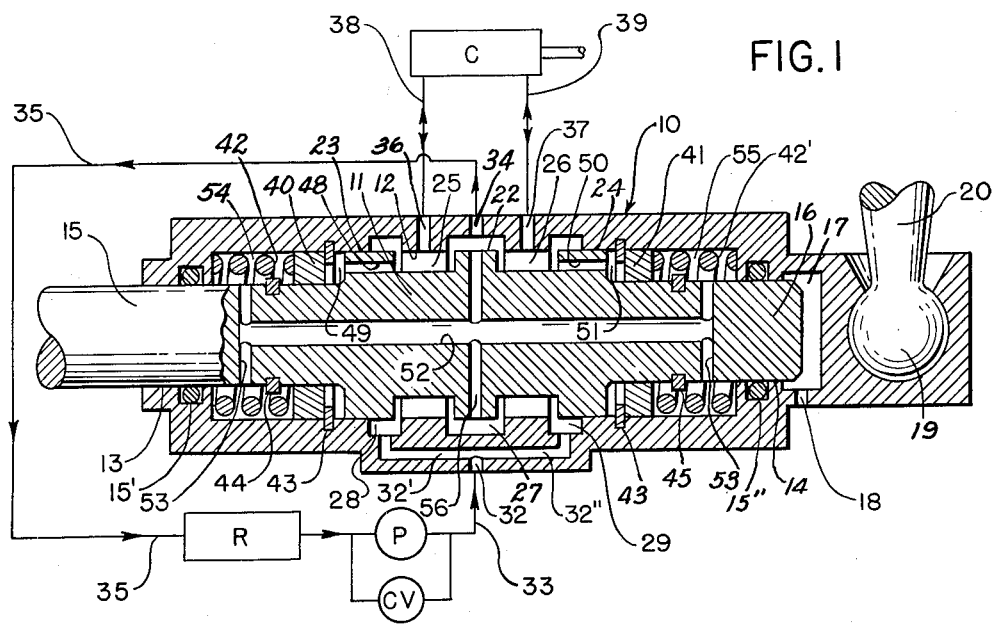
Fig. 1 is a longitudinal sectional view of one illustrative valve in accordance with the invention.

In Fig. 1, numeral 10 designates generally a valve body, and numeral 11 a valve spool slidable in the main bore 12 of body 10, the end walls of said body having reduced bores 13 and 14 for valve stems 15 and 16 extending from opposite ends of spool 11. As here shown, the stem 15 extends through the end of the valve body and is integral with, or becomes, the drag link of the steering linkage, not shown. Stems 15 and 16 are provided with suitable fluid pressure seals, as indicated at 15' and 15". The stem 16 projects into a chamber 17, vented to atmosphere by a passage 18. The same end of the valve body 10 is mounted pivotally on ball 19 of the usual pitman arm 20 of the conventional manually operated steering gear. It will be seen that in this illustrative embodiment, the valve body 10, directly connected to the pitman 20, becomes the steering-wheel-connected member of the valve, while the valve spool becomes the road-wheel-connected member of the valve. It will later be shown how these parts may be interchanged.

The valve spool 11 has certain lands and grooves cooperating with certain grooves and passages in the valve body to form a more or less conventional four-way slide valve. In the example shown, the spool has a central land 22 and two outside lands 23 and 24, spaced from central land 22 by annular grooves 25 and 26, respectively, the lands being understood to have a close sliding fit in valve bore 12. Annular grooves 27, 28 and 29 are formed in bore 12, groove 27 being centrally located and being slightly wider than land 22, and the two grooves 28 and 29 being located generally opposite lands 23 and 24, respectively, with the adjacent sides thereof spaced at a distance less than that between the adjacent sides of lands 23 and 24, all as clearly shown in Fig. 1.

A fluid port 32, adapted for connection with an external fluid line 33, communicates with branch passages 32' and 32" leading to grooves 28 and 29, respectively. A fluid port 34, adapted for connection with external fluid line 35, communicates with groove 27. Fluid ports 36 and 37, adapted for connection with fluid lines 38 and 39, respectively, communicate with the grooves 25 and 26, respectively, of spool 11.

Reaction rings 40 and 41, positioned at opposite ends of the valve spool, have close sliding fits within the bore 12 and also have close sliding fits on the spool stems 15 and 16, respectively. These reaction rings are yieldingly positioned by coil springs 42 and 42' in engagement with snap rings 43 set into suitable grooves in bore 12 and so spaced as to permit limited relative motion between spool 11 and body 10 in one direction sufficient for land 23 to block groove 28 and for land 22 to block one side of groove 27, and in the other direction sufficient for land 24 to block groove 29 and for land 22 to block the other side of groove 27. The springs 42 are preferably, though not essentially, preloaded, and they are lodged within spring pockets at opposite ends of the valve bore 12, so as to seat against the end walls of the valve body and to bear against the outer surfaces of the reaction rings 40 and 41.

Snap rings 44 and 45 seated in and projecting from suitable grooves in valve stems 15 and 16, respectively, are so positioned that clearances remain between them and the reaction rings with spool 11 in engagement with either of the snap rings 43. In other words, the clearance between enlarged portion of the valve spool and the adjacent snap ring 43 in the normal or centered position of the valve (Fig. 1) is less than the clearance between the snap rings 44 and 45 and the adjacent surfaces of the reaction rings 40 and 41, all as clearly shown in the drawing.

A fluid passage 48 in the valve spool establishes communication between groove 25 and a reaction chamber 49 which is formed between the reaction ring 40 and the adjacent annular end surface of the spool 11. A similar passage 50 establishes communication between groove 26 and reaction chamber 51 at the opposite end of the valve. A longitudinal bore 52 in the spool communicates with the spring pockets 54 and 55 via ports 53, and communicates, via passage 56 opening through land 22, with the groove 27. These passages permit fluid flow to and from the spring pockets 54 and 55 as the valve body 10 is moved relative to the spool.

The system includes a hydraulic pump P whose output is connected to fluid line 33, and whose input leads from reservoir R, receiving return fluid from the valve via fluid line 35. The power cylinder conventionally indicated in Fig. 1 at C, and understood to be typically connected into the steering linkage in any suitable or conventional fashion, is connected at opposite ends to the two fluid lines 38 and 39. The power cylinder will further be understood to contain a working piston and connecting rod, and the cylinder and this connecting rod may be operatively connected one to the car frame and the other to an operating member of the steering linkage.

Operation of the system as thus described is as follows:

Assume first that the steering gear is actuated so as to move ball 19 of pitman arm 20 to the right, moving valve body 10 a short distance to the right relative to spool 11 and drag link 15. This results in the port 37 and the end of power cylinder C to which it is connected being opened more freely via groove 26, groove 27, and port 34 to reservoir R, permitting flow from that end of the power cylinder to the reservoir. At the same time, the port 37 and corresponding end of power cylinder C are blocked off more or less completely from the passage 32" leading from the pump outlet. Passage 36 and the other end of the power cylinder are at the same time opened more freely to the pump outlet by way of passage 32' and groove 28, and are more or less completely blocked off from the reservoir. In consequence, pressure is built up in the end of the power cylinder C to which passage 36 is connected, and the cylinder, acting through its plunger, exerts a steering effort proportional to the pressure.

The same pressure exists in groove 25 and is transmitted via passageway 48 to reaction chamber 49 where it exerts on reaction ring 40 a force, transmitted by spring 42 to valve body 10, proportional to the pressure and effective to cause valve body 10 to react toward the left, as viewed in the drawings, against ball 19 of pitman arm 20, thus supplying the desired "steering load-feel." The pressure in reaction chamber 49 also acts on the exposed annular surface of spool 11, causing the spool to transmit to the drag link 15 a force equal to the force exerted on reaction ring 40, but opposite in direction, so that the steering force on the steering linkage will be the sum of the forces exerted by the power cylinder C and by hydraulic reaction upon spool 11.

The hydraulic load-feel reaction transmitted as described through the valve body and pitman 20 to the steering wheel is proportional to hydraulic pressure, and hence to road wheel steering force, only so long as hydraulic force on reaction ring 40 is less than that required to compress spring 42 sufficiently for ring 40 to bear on snap ring 44, since the abutment of ring 40 on snap ring 44 prevents the transmission to the valve body 10 of any reaction greater than the spring force at the abutment of reaction ring 40 on snap ring 44. The steering load-feel is thus limited to the value established by the compression of spring 17 upon abutment of reaction ring 40 against snap ring 44. Additional hydraulic pressure in the power cylinder developed to supply additional needed road wheel steering force, though communicated to reaction chamber 49, thus is incapable of further increasing the load-feel transmitted to the driver beyond that set when the reaction ring 40 comes into engagement with snap ring 44. Accordingly, driver effort increases proportionately to road wheel steering force until a predetermined maximum is reached. Thereafter, the reaction transmitted to the driver, i. e., the load-feel, or driver effort, remains constant to any degree of increased road wheel steering force within the capacity of the system.

If the steering gear is actuated to move pitman arm 20 and the valve body to the left, hydraulic pressure will be developed in the opposite end of power cylinder C, and this pressure will act in chamber 51 on reaction ring 41 and be transmitted to valve body 10 through spring 42a, again giving load-feel which is transmitted to the driver; and if the hydraulic force on reaction ring 41 exceeds the value determined by spring 42', reaction ring 41 abuts on snap ring 45, again limiting the reaction or load-feel transmitted to the driver.

In the event of failure of hydraulic power, and assuming the line between the pump outlet and passages 32' and 32" to be equipped with a check valve opening into said line from the suction side of the pump, as indicated at cv, movement of the valve body 10 will be transmitted, with loss due to the clearance between spool 11 and snap rings 43, to spool 11 by the engagement against said spool of one or the other of the snap rings, so that a mechanical steering connection will be available.

Figure 2:
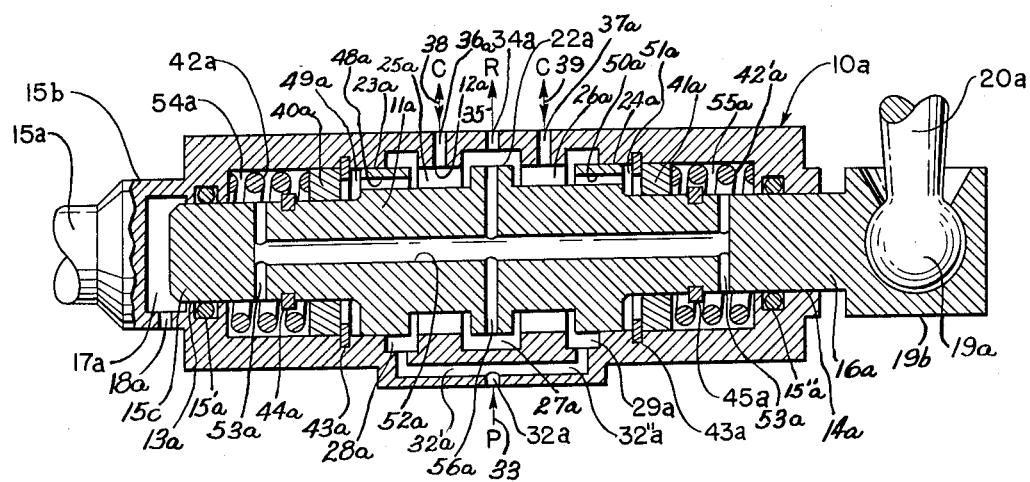
Fig. 2 is a longitudinal sectional view of a valve similar to that of Fig. 1, but with steering-wheel-connected and road-wheel-connected members reversed.

Fig. 2 shows the same identical valve illustrated in Fig. 1, but with the steering-wheel-connected and road-wheel connected members reversed. That is to say, the drag link, here indicated by numeral 15a, extends from a box 15b which is integral with the left hand end of the valve body 10a, while the pitman arm 20a and ball 19a are coupled to a suitable socket in a head 19b on the end of spool valve stem 16a which in this case protrudes through the right hand end of the valve body. The valve stem 15c on the left hand end of the valve spool 11a projects into vented chamber 17a formed in box 15b. Otherwise, the valve is identical with the showing of Fig. 1, and corresponding parts designated by like reference numerals but with the sub letter "a" adjoined in the case of Fig. 2. The external fluid lines, power cylinder, reservoir and pumps are also the same as shown in Fig. 1, being conventionalized by use of indicating arrows in Fig. 2. These members will be referred to by use of the same reference numerals applied in Fig. 1. The spool thus, in the case of Fig. 2, becomes the steering-wheel-connected member and the valve body the road-wheel-connected member. For example, assume the pitman arm 20a (Fig. 2) again moved to the right. This shifts the spool toward the right relative to the valve body, and the result is to exhaust fluid from one end of the power cylinder via line 38 connected to port 36a, groove 25a, groove 27a, port 34a, and return line 35, and to feed pressure fluid to the power cylinder via line 33, passage 32, groove 29a, groove 26a, and line 39. Also, pressure fluid is fed from groove 26a through port 50a to chamber 51a. This pressure fluid then acts both on the corresponding end of the valve spool, and on reaction ring 41a, moving the latter against spring 42'a. The load feel is the force imposed by the hydraulic pressure on the end face of the valve spool, this force being transmitted to the driver directly, and not through the spring. The spring in this case, compressed by reaction ring 41a, transmits a force, equal to the "load-feel," to the road-wheel member, i. e., valve body 10a. The reaction ring thus moves against the spring as hydraulic pressure is developed, and when a predetermined pressure is attained, engages and is stopped by the snap ring 45a. Further increase in hydraulic pressure does not further increase the load feel transmitted to the driver, because of equal and opposed areas on the spool and the reaction ring then seated rigidly against the snap ring. The load feel remains equal to the force exerted by the compressed spring.

Figure 3:
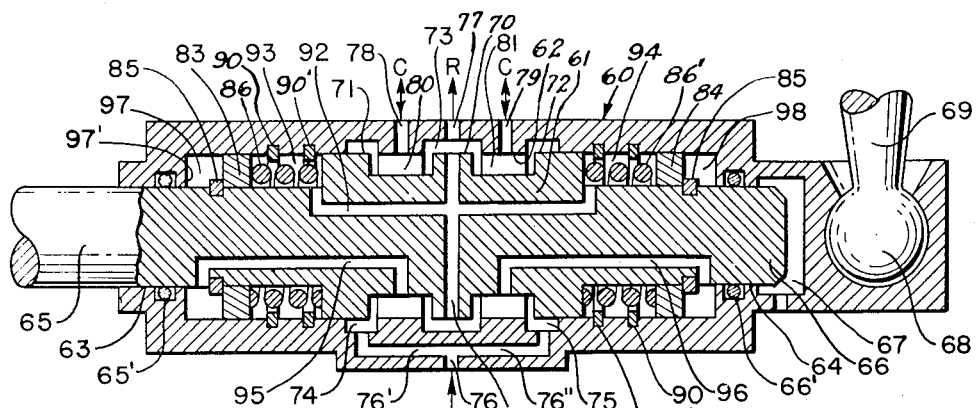
Fig. 3 is a view similar to Fig. 1, but showing a modification.

Fig. 3 shows a modification, in which there is a valve body 60 substantially identical with the body 10 of Fig. 1, the valve spool 61 having certain parts reversed or interchanged as compared with the embodiment of Fig. 1. Vave spool 61 is slidable in bore 62 of body 10, and the valve body has reduced bores 63 and 64 for valve stems 65 and 66, respectively, extending from opposite ends of the spool. The stem 65 is integral with or a part of the drag link of the steering linkage. Stem 66 projects into vented air chamber 67, and the corresponding end of the valve body is pivotally mounted on ball 68 of pitman arm 69 of the steering mechanism. The valve body is thus again the steering-wheel-connected member, while the valve spool is the road-wheel-connected member.

The valve spool has central land 70 and outside lands 71 and 72, and the valve body has annular grooves 73, 74, and 75, similar to the embodiment of Fig. 1. Fluid port 76, receiving pressure fluid from a line connected to the output side of the pump, has branch passages 76' and 76" leading to grooves 74 and 75, respectively, and a port 77 leads from groove 73 to a line understood to deliver return fluid to a reservoir, which in turn supplies fluid to the pump, all as in the arrangement of Fig. 1. Two ports 78 and 79, communicating respectively with grooves 80 and 81 in the valve spool, lead to the two ends of the power cylinder.

Reaction rings 83 and 84 are slidable on the stems 65 and 66 of the valve spool and within the bore 62 of the valve body, and these rings normally seat against snap rings 85 on the valve stems 65 and 66 under pressure exerted by reaction springs 86 acting between said reaction rings and the adjacent end surfaces on the valve spool, as clearly shown. Snap rings 90 set into suitable grooves in the valve body limit axial movement of the reaction rings and the compression of the springs 86, as will be evident.

The valve spool has a fluid passage 91 opening through land 70 into groove 73, and hence in communication with port 77 connected to the return line, and this passageway 90 is in communication with a passageway 92 leading to the two spring chambers 93 and 94. Fluid passages 95 and 96 connect valve spool groove 80 with the chamber 97 in back of reaction ring 83, and groove 81 with the chamber 98 in back of reaction ring 83.

Assume now that the steering gear is actuated so as to move ball 68 of pitman arm 69 to the right, moving valve body 60 a short distance to the right relative to spool 61 and drag link 65. This results in exhausting fluid from one end of the power cylinder and feeding fluid to the other end thereof, in a manner exactly similar to that described in connection with Fig. 1. Pressure fluid from the pump is at this time permitted to flow through branch passage 76' to groove 80, the other branch groove 76" being cut off. This fluid is thence transmitted via passage 95 into chamber 97, where it acts both against reaction ring 83, and against valve body surface 97' to create a thrust toward the left on the valve body, which is the steering-wheel-connected member, thus supplying the desired "load-feel." The hydraulic pressure in chamber 97 acting against reaction ring 83 moves the latter against spring 86, which transmits a corresponding force, equal to the "load-feel" thrust, to the output member, which in this case is the valve spool 61. When a predetermined pressure is attained in chamber 97, the reaction ring engages snap ring 90, and further increase in hydraulic pressure does not further increase the load feel thrust transmitted to valve body 60 and thence to the driver, because of equal and opposed areas on the valve body surface 97' and the reaction ring then seated rigidly against snap ring 90. The load-feel accordingly remains equal to the force exerted by the compressed spring notwithstanding further increased hydraulic pressure with increasing steering effort corresponding to that at which the reaction ring seats on snap ring 90.

Figure 4:
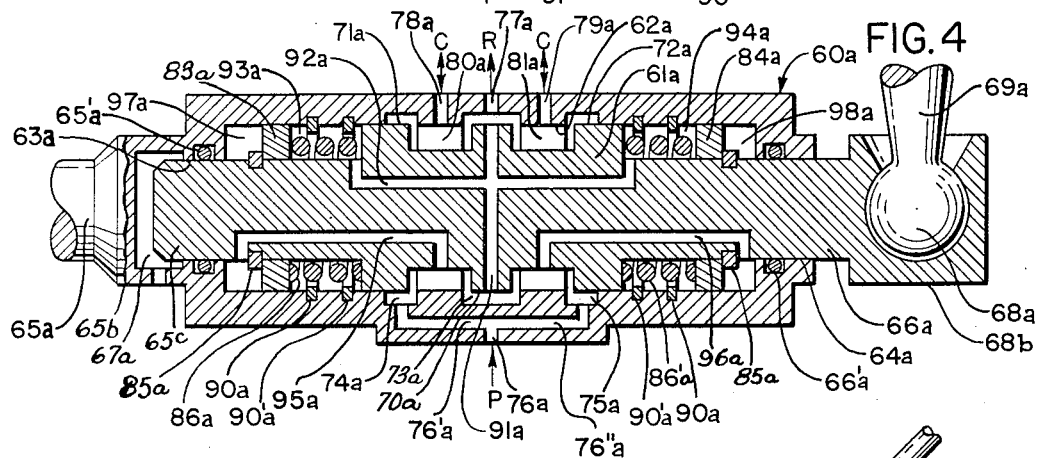
Fig. 4 is a longitudinal sectional view showing a valve similar to that of Fig. 3, but with steering-wheel-connected and road-wheel-connected members reversed.

A fourth example results from reversing the steering-wheel-connected and road-wheel-connected members of Fig. 3. Thus, referring to Fig. 4, the drag link, here indicated by numeral 65a, extends from a box 65b which is integral with the left hand end of valve body 60a, while the pitman arm 69a and ball 68a are coupled to a suitable socket in a head 68b on the end of spool valve stem 66a which in this case protrudes through the right hand end of the valve body. The valve stem 65c on the left hand end of valve spool 61a projects into vented chamber 67a formed in box 65b. Otherwise, the valve is identical with the showing of Fig. 3, and reference is made to Fig. 3 for the remaining details of the internal construction of the valve of Fig. 4. In the arrangement of Fig. 4, the spool thus becomes the steering-wheel-connected member and the valve body the road-wheel-connected member. For example, assume pitman arm 69a again moved to the right. This shifts the spool toward the right relative to the valve body, and the result is to exhaust fluid from one end of the power cylinder via passage 78a, groove 80a, groove 73a, and port 77a to reservoir return. This also results in feeding pressure fluid to the other end of the power cylinder by way of port 76a (connected to the discharge side of the pump) via passage 76"a, groove 75a, groove 81a and port 79a. Also, pressure fluid is fed through passage 96a to chamber 98a. This pressure fluid in chamber 98a then acts both on the corresponding end of the valve housing, and on reaction ring 84a, moving the latter against spring 86'a. The resulting force exerted by spring 86'a against the valve spool 61a furnishes the desired "load-feel" reaction, which is again, as in earlier described forms of the invention, limited to a predetermined maximum upon engagement of reaction ring 84a with snap ring 90a. Thereafter, the reaction transmitted to the driver remains constant to any degree of increased road wheel steering force.

Figure 5:
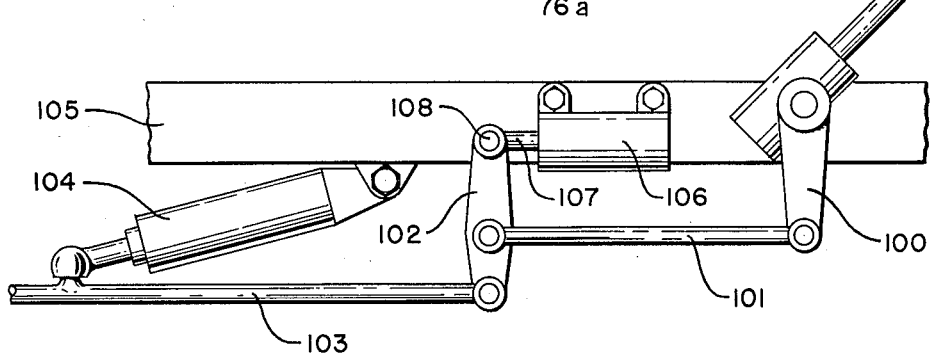
Fig. 5 is a diagrammatic view indicating one method of using the valve of the invention.

The foregoing description has assumed primarily a system in which the valve body and valve spool stem are interposed in a series arrangement between the pitman arm and the drag link. However, my valve assembly may be placed in what amounts to a "parallel" arrangement with relation to the linkage from the pitman arm to the steering linkage. Fig. 5 is illustrative, showing pitman arm 100, a link 101 connecting said arm to an intermediate point of a lever 102, and a link 103 connecting the lower end of lever 102 to the steering linkage. Power cylinder and piston assembly 104 is shown as connected between the car frame 105 and link 103 whereby its effort is contributed to the road wheel steering force. My valve and spool assembly is designated by numeral 106, the valve body rigidly mounted on the frame 105, and the spool stem 107 pivotally connected at 108 to the upper arm of lever 102. Relative motion between links 101 and 103 (the steering wheel and road wheel connected members, respectively) shifts the position of the upper end of lever 102, causing the latter to either push or pull on the valve stem, thereby effecting a corresponding displacement of the valve stem, and a corresponding lost motion between the members 101 and 103. The back reaction developed by my valve to the resultant movement of the valve spool is transmitted back to the pitman arm to furnish the limited load-feel reaction to the driver, the movement of the spool being understood to control flow of pressure fluid to the power cylinder.

The foregoing description has also assumed primarily a linkage-type power steering system with the reaction-limiting mechanism integral with the valve, and with the valve separate from the power cylinder. Other organizations, requiring no detailed explanation, are possible. For example, the valve and power cylinder may be combined, or the reaction limiting mechanism may be separate from the valve, or my invention may be employed in what are known as integral-type power steering systems, in which the valve and cylinder are integral with the steering gear.

The drawings and description will be understood as confined to certain present illustrative embodiments of the invention, and it will be further understood that many additional changes in design, structure and arrangement may be made without departing from the scope of the appended claims.

I claim:

1. In a power hydraulic steering system having a directional hydraulic fluid control valve and a fluid motor having two sides, the combination of: a pair of fluid chambers, means communicating to one chamber a fluid pressure proportional to the fluid pressure in one side of said motor, means communicating to the other chamber a fluid pressure proportionate to the fluid pressure in the other side of said motor, mechanically interconnected fluid pressure responsive force transmitting means exposed to said proportionate fluid pressures in said chambers, other fluid pressure responsive means positioned in said chambers exposed to and movable by said proportionate pressures, spring means opposing such movement of the last mentioned pressure responsive means, mechanically interconnected force transmitting means supporting said spring means, and arranged for relative movement with respect to said mechanically interconnected fluid pressure responsive force transmitting means, and stop means fixed relative to said mechanically interconnected fluid pressure responsive force transmitting means for limiting spring opposed movement of said other fluid pressure responsive means.

2. The subject matter of claim 1, wherein said mechanically interconnected force transmitting means is a steering-wheel-connected member, and is adapted for movement by driver steering effort, and opposed in such movement by thrust exerted by said spring means, said thrust increasing with increasing fluid pressure until said other fluid pressure responsive means engages and is stopped by said stop means.

3. The subject matter of claim 1, wherein said mechanically interconnected fluid pressure responsive force transmitting means is a steering-wheel-connected member, and is adapted for movement by driver steering effort, and opposed in such movement by fluid pressure exerted thereagainst up to a limiting value of fluid pressure established by movement of said other pressure responsive means against said spring means to the point of abutment against said means.

4. A load-feel reaction device for a power steering system, comprising: a longitudinally bored body having end walls, a spool working in a bore in said body, stems on opposite ends of said spool projecting slidably through said end walls of said body, reaction rings surrounding said stems slidable longitudinally on said stems and in said bored body, stops fixed in said body limiting movement of said reaction rings toward said spool, there being pressure fluid chambers in said body between said reaction rings and the ends of said spool, and fluid passages for selectively conveying pressure fluid to said chambers, springs seated in and against said body engaging said reaction rings and yieldingly opposing movement of said rings by fluid pressure in said chambers, and stops on said stems engageable by said rings in the course of such movement against said springs to limit the force exerted by said springs against said body to a predetermined maximum.

5. A load-feel reaction device for a power steering system, comprising: a longitudinally bored body having end walls, a spool working in a bore in said body, stems on opposite ends of said spool projecting slidably through said end walls of said body, reaction rings surrounding said stems slidable longitudinally on said stems and in said bored body, stops fixed on said stems limiting movement of said reaction rings toward the end walls of said body, there being pressure fluid chambers in said body between said rings and said end walls, and fluid passages for selectively conveying pressure fluid to said chambers, springs acting between the ends of said spool and the corresponding reaction rings to yieldingly oppose movement of said rings by fluid pressure in said chambers, and stops in said body engageable by said rings in the course of such movement against said springs to limit the force exerted by said springs against said spool to a predetermined maximum.

6. A load feel reaction device for a power steering system having a pressure fluid source and a hydraulic motor having two sides, comprising: a longitudinally bored valve body having end walls, a valve spool working in a bore in said body, stems on opposite ends of said spool projecting slidably through said end walls of said body, reaction rings surrounding said stems slidable longitudinally on said stems and in said bored body, stops fixed in said body limiting movement of said reaction rings toward said spool, there being pressure fluid chambers in said body between said reaction rings and the ends of said spool, springs seated in and against said body engaging said reaction rings and yieldingly opposing movement of said rings by fluid pressure in said chambers, stops on said stems engageable by said rings in the course of such movement against said springs to limit the force exerted by said springs against said body to a predetermined maximum, and coacting valve elements and passageways in said spool and body for selectively controlling flow of pressure fluid from said source to one or the other side of said hydraulic motor and to a corresponding one of said pressure fluid chambers.

7. A load-feel reaction device for a power steering system having a pressure fluid source and a hydraulic motor having two sides, comprising: a longitudinally bored valve body having end walls, a valve spool working in a bore in said body, stems on opposite ends of said spool projecting slidably through said end walls of said body, reaction rings surrounding said stems said stems slidable longitudinally on said stems and in said bored body, stops fixed on said stems limiting movement of said reaction rings toward the end walls of said body, there being pressure fluid chambers in said body between said rings and said end walls, springs acting between the ends of said spool and the corresponding reaction rings to yieldingly oppose movement of said rings by fluid pressure in said chambers, stops in said body engageable by said rings in the course of such movement against said springs to limit the force exerted by said springs against said spool to a predetermined maximum, and coacting valve elements and passageways in said spool and body for selectively controlling flow of pressure fluid from said source to one or the other side of said hydraulic motor and to a corresponding one of said pressure fluid chambers.

8. In a hydraulic power steering system having limited lost motion between a steering-wheel-connected member and a road-wheel-connected member, a fluid flow directing means operated by virtue of said lost motion, a reaction means movable relative to said members, means for exerting fluid pressure upon said reaction means, spring means acted upon by said reaction means, a stop engageable by said reaction means after limited movement against said spring means, said reaction means and said spring means being so arranged as, upon engagement of said stop by said reaction means, to limit, to the force exerted by the spring means, the force opposing relative motion between said steering-wheel-connected member and said road-wheel-connected away from a neutral position.

References Cited in the file of this patent

UNITED STATES PATENTS

| 2,596,242 | Hill | May 13, 1952 |
| 2,608,263 | Garrison | Aug. 26, 1952 |
| 2,679,235 | Meter | May 25, 1954 |
| 2,685,170 | Price | Aug. 3, 1954 |

FOREIGN PATENTS

| 668,388 | France | July 9, 1929 |